United States Patent [19]
Bhagavath et al.

[11] Patent Number: 6,163,810
[45] Date of Patent: Dec. 19, 2000

[54] SYSTEM AND METHOD FOR MANAGING THE EXCHANGE OF INFORMATION BETWEEN MULTICAST AND UNICAST HOSTS

[75] Inventors: Vijay K. Bhagavath, Lincroft, N.J.; Joseph Thomas O'Neil, Staten Island, N.Y.

[73] Assignee: AT&T Corp., New York, N.Y.

[21] Appl. No.: 09/088,623

[22] Filed: Jun. 2, 1998

[51] Int. Cl.[7] .............................. G06F 13/38; G06F 15/17
[52] U.S. Cl. .................... 709/238; 709/239; 709/240; 370/229; 370/351
[58] Field of Search ........................... 709/238, 220, 709/239, 240, 234, 235; 710/131, 52, 53, 54, 55, 56; 340/825.03, 825.79; 359/117; 370/229, 351, 418, 485, 486, 487; 379/219, 242

[56] References Cited

U.S. PATENT DOCUMENTS

| | | | |
|---|---|---|---|
| 5,361,256 | 11/1994 | Doeringer et al. | 370/60 |
| 5,777,989 | 7/1998 | McGarvey | 370/254 |
| 5,822,523 | 10/1998 | Rothschild et al. | 709/236 |
| 5,835,723 | 11/1998 | Andrews et al. | 709/226 |
| 5,856,974 | 1/1999 | Gervais et al. | 370/392 |
| 5,870,386 | 2/1999 | Perlman et al. | 370/256 |
| 5,884,035 | 3/1999 | Butman et al. | 709/218 |
| 5,909,438 | 6/1999 | Melden et al. | 370/388 |
| 5,920,699 | 7/1999 | Bare | 709/225 |
| 5,963,547 | 10/1999 | O'Neil et al. | 370/260 |
| 5,963,556 | 10/1999 | Varghese et al. | 370/401 |
| 5,974,452 | 10/1999 | Karapetkov et al. | 709/218 |
| 5,982,775 | 11/1999 | Brunner et al. | 370/401 |
| 5,983,005 | 11/1999 | Monteiro et al. | 709/231 |
| 5,991,297 | 11/1999 | Palnati et al. | 370/389 |
| 6,003,083 | 12/1999 | Davies et al. | 709/226 |
| 6,005,698 | 12/1999 | Huber et al. | 359/117 |
| 6,023,467 | 2/2000 | Abdelhamid et al. | 370/395 |
| 6,041,166 | 3/2000 | Hart et al. | 709/238 |
| 6,047,325 | 4/2000 | Jain et al. | 709/227 |

FOREIGN PATENT DOCUMENTS

| | | | |
|---|---|---|---|
| 795980 A2 | 9/1997 | European Pat. Off. | H04L 12/24 |
| 888029 A2 | 6/1998 | European Pat. Off. | H04L 11/04 |

OTHER PUBLICATIONS

Estrin et al.,RFC2117, Protocol Tndependent Multicast–Sparse Mode (PIM–SM): Prrotocol specification, 59 pages, Jun. 1997.

Information Science Institute, University of Southern California, Internet Protocol, RFC 791, DARPA Internet Program Protocol Specification, Sep. 1981,45 pages.

Steve Deering, RFC 1112, Host Extensions for IP Multicasting, August 1989, 15 pages.

*Primary Examiner*—Zarni Maung
*Assistant Examiner*—Bunjob Jaroenchonwanit
*Attorney, Agent, or Firm*—Kenyon & Kenyon

[57] ABSTRACT

A network ed system of multicast-unicast gateways receives multicast information from a multicast host. A first MUG receives a multicast session request from a unicast host. The first MUG sends a message to other MUGs with a unicast host identifier. Each MUG that receives the message determines if it is designated to serve as the multicast-unicast gateway for the requesting unicast host. A MUG is designated if it is disposed to more efficiently act as a multicast-unicast gateway for the requesting unicast host. If it is, it sends a designation message to the first MUG, which reroutes the unicast host request to the designated MUG. If a designated MUG is identified, then the designated MUG acts as the multicast-unicast gateway for the unicast host. Otherwise, a default MUG acts as the gateway. This more efficiently uses network resources in managing the exchange of information between multicast and unicast hosts.

29 Claims, 4 Drawing Sheets

SYSTEM AND METHOD FOR MANAGING THE EXCHANGE OF INFORMATION BETWEEN MULTICAST AND UNICAST HOSTS

FIELD OF THE INVENTION

The present invention relates to providing an interface between a unicast host and a multicast host over a network, and in particular to the coordinated use of multicast-unicast gateways (MUGs) to provide multicast-unicast interfaces in a way that makes efficient use of network bandwidth.

BACKGROUND OF THE INVENTION

Information can be unicast, broadcast and multicast on a network. Unicast information is sent to a single host on the network. Broadcast information is sent to all hosts on a given network. Multicast information is sent to a particular set of hosts. The set of hosts to which multicast information is sent is called a multicast group. Multicast information can absorb a substantial amount of network bandwidth, so it is important to deliver multicast information as efficiently as possible.

An addressing scheme can be used to control the unicast, broadcast and multicast of information on a network. As used herein, the term "network" includes an internetwork (a network ed collection of networks). An example of an addressing scheme used on a network (the Internet) is the Internet Protocol (IP), which is specified in RFC 791, http://www.nexor.com/public/rfc/rfcs/rfc791.txt, visited Mar. 23, 1998.

An IP address specifies the target of information sent over the Internet. When the most significant four bits of an IP address are set to 1110, the address is understood to refer not to a single host (unicast) or to all hosts (broadcast), but to a particular set of hosts. The remaining 28 bits of the IP address specify the particular "multicast group" to which the address refers. The set of hosts that belong to a multicast group can be members of different networks, and hosts can join and leave a group at will. Gateways and routers in the network track which hosts belong to which multicast groups, and ensure that multicast information is delivered to the right host members. An example of a protocol that supports multicasting is the Internet Group Management Protocol, RFC 1112, http://www.nexor.com/public/rfc/rfcs/rfc1112.txt, visited Mar. 23, 1998.

A host that sends and/or receives information that is multicast is called a "multicast host." A host that sends and/or receives information that is unicast is called a "unicast host."

In one known system, information is multicast directly between multicast hosts. However, this requires that the gateways and routers through which the information is sent have multicast capability. This disadvantageously increases the complexity and cost of gateways and routers throughout the network. In fact, many routers on the Internet presently do not support multicasting. As a result, many hosts on the Internet are unicast hosts, and can neither directly nor indirectly send and/or receive information that is multicast.

This problem has been addressed by employing a known apparatus called a multicast-unicast gateway (MUG). In one embodiment that can be employed on the Internet, a MUG translates multicast-addressed information that it receives from a multicast host into unicast-addressed information for unicast hosts, and vice versa. In this way, a unicast host can send and/or receive information to and/or from a multicast host. In other words, a MUG provides a multicast-unicast gateway that allows both multicast hosts and unicast hosts to participate in the same multicast session. A method and system for allowing a unicast host to participate in a multicast session using a MUG is disclosed in U.S. patent application Ser. No. 08/927,426, Method and System for a Unicast Endpoint to Access a Multicast Internet Protocol (IP) Session, filed Sep. 11, 1997, which is incorporated herein by reference.

The use of a MUG relieves the network from the burden of having to provide all of its gateways and routers with multicast capability, advantageously reducing their cost and complexity, while advantageously providing unicast hosts with the capability to participate in multicast sessions with multicast hosts.

However, known systems for delivering multicast information using MUGs do not always make the most efficient use of network bandwidth. In one known system, a unicast host is assigned to a particular MUG that acts as that unicast host's only interface to multicast sessions. In another known system, a unicast host can contact any of several MUGs to interface to a multicast session. These arrangements ignore factors that can effect the efficiency with which network bandwidth is utilized, such as the unicast host's location. For example, suppose a multicast host in the United States sends multicast information to a MUG that is also in the United States. Unicast hosts in the United States participate in this multicast session through the MUG in the United States. A thousand unicast hosts in France then join the multicast session. A thousand individually-addressed unicast streams of information then flow between the MUG in the United States and the unicast hosts in France. This is an inefficient use of network resources.

A better way would intelligently assign a unicast host to a MUG to make more efficient use of network bandwidth. For example, information could be multicast from the multicast host to each of several MUGs, and the United States unicast hosts would be served from a MUG in the United States, while the French unicast hosts would be served from a MUG in France. The thousand unicast streams of information between the United States and France would be replaced by a single multicast stream from the multicast host in the United States to the MUG in France. The MUG in France would then support the thousand streams of unicast information over a shorter, more local segment of the network to the unicast hosts in France.

FIG. 1 shows a MUG 402 in the United States providing a multicast-unicast interface to unicast hosts 406 in France. In FIG. 1, a multicast host 401 (which in this example is outside both the United States and France) multicasts information to MUG A 402 in the United States and to MUG B 403 in France. The information flow between multicast host 401 and MUGS A 402 and B 403 is shown by solid lines 404 and 405, respectively. Unicast hosts 406 in France send requests to MUG A 402 to join a multicast session with multicast host 401. MUG A 402 acts as an interface between the multicast host 401 and the unicast hosts 406. The information flow between MUG A 402 and the unicast hosts 406 is shown by solid lines 407.

FIG. 2 shows the same configuration, but MUG B located in France serves as the interface between the multicast host 401 and the French unicast hosts 406. The information flow between the MUG B and the unicast hosts is shown by solid lines 408. FIG. 2 shows a more efficient use of network resources because the information flow 408 to the unicast hosts 406 in FIG. 2 traverses a shorter distance (within France) than the information flow 407 (between France and the United States) shown in FIG. 1.

If a MUG receives a request from a unicast host to participate in a multicast session, a mechanism is needed to determine which MUG is best disposed to efficiently serve as the interface between that unicast host and the multicast host. The request may then be redirected to the appropriate MUG such that network resources are used efficiently when unicast hosts join a multicast session.

SUMMARY OF THE INVENTION

An embodiment of the present invention provides for the more efficient participation of unicast hosts in a multicast session by providing a network of MUGs that coordinate unicast host participation requests to ensure that the MUG most efficiently disposed in relation to a particular unicast host acts as the interface for that unicast host to the multicast session.

In one embodiment of the apparatus in accordance with present invention, a MUG includes a processor, a memory and a port. The processor, memory and port are coupled to each other. The port is adapted to be coupled to a network. The memory stores multicast information management instructions that are adapted to be executed by the processor to perform the steps of the method in accordance with an embodiment of the present invention.

In the method in accordance with one embodiment of the present invention, a request is received from a unicast host at a request server for multicast information. As used herein, such a request is a multicast session request. A request server can be a separate server or a multicast host or a first MUG. If the request server is not the first MUG, then the request server redirects the unicast host to send its request to a first MUG. The unicast host sends its request along with a unicast host identifier to the first MUG. A unicast host identifier is any information, typically sent by the unicast host, that is used in determining which MUG is best disposed to provide an interface to the multicast session for the unicast host. Examples of a unicast host identifier include a unicast host name, a network address, a zip code, a time zone designation, a geographical designation, a priority designation (e.g., high priority, medium priority, low priority), etc.

When the first MUG receives the multicast session request from a unicast host, it determines if it is best disposed to serve as the interface to a multicast session for that unicast host. A MUG that is determined to be best disposed to provide a multicast session interface for a unicast host is said to be "designated" for that unicast host.

In one embodiment, a MUG determines if it is designated for a particular unicast host by checking a table of unicast host identifiers stored at the MUG. If the MUG stores the unicast host identifier in its table, then it is designated to respond to that unicast host. Otherwise, it is not.

If the first MUG is designated to provide multicast information to the requesting unicast host, then the first MUG serves as the multicast-unicast interface for the unicast host. If the first MUG is not designated for that unicast host, it sends the unicast identifier to a second MUG. In one embodiment, the unicast host identifier is sent to a plurality of MUGs. As used herein, this plurality of MUGs includes the so-called "second MUG." In one embodiment, the unicast host identifier is multicast to a plurality of MUGs. Each MUG that receives the unicast host identifier from the first MUG determines if it is designated for that unicast host, based upon the unicast host identifier. For example, if the unicast host identifier is found in the table stored at that MUG, then the MUG is designated for that unicast host. If not, the MUG is not designated for that unicast host.

If the first MUG receives a designation message from the MUG that is designated for the unicast host, then a redirect message is then sent from the first MUG to the unicast host that instructs the unicast host to redirect its multicast session request to the designated MUG. If no designation message is received, then a default MUG handles the multicast session request. For example, the default MUG in one embodiment is the first MUG. In another embodiment, the first MUG redirects the multicast session request to another MUG that is the default MUG. When the request is redirected, the designated or default MUG serves as a multicast-unicast interface between the unicast host and the multicast host.

An embodiment of the present invention advantageously receives a request for multicast information from a unicast host, determines the MUG best disposed to deliver that information to the unicast host, and redirects the unicast host to request the information from the best disposed MUG. The multicast information is then provided to the unicast host from the best disposed MUG. The present invention thereby makes more efficient use of network bandwidth than known systems for distributing multicast information.

DETAILED DESCRIPTION

An embodiment of the present invention includes a networked collection of at least two MUGs that coordinate unicast host multicast session requests to ensure that the best disposed MUG in relation to the unicast host acts as the multicast-unicast interface, making the most efficient use of network bandwidth.

Figure 1:
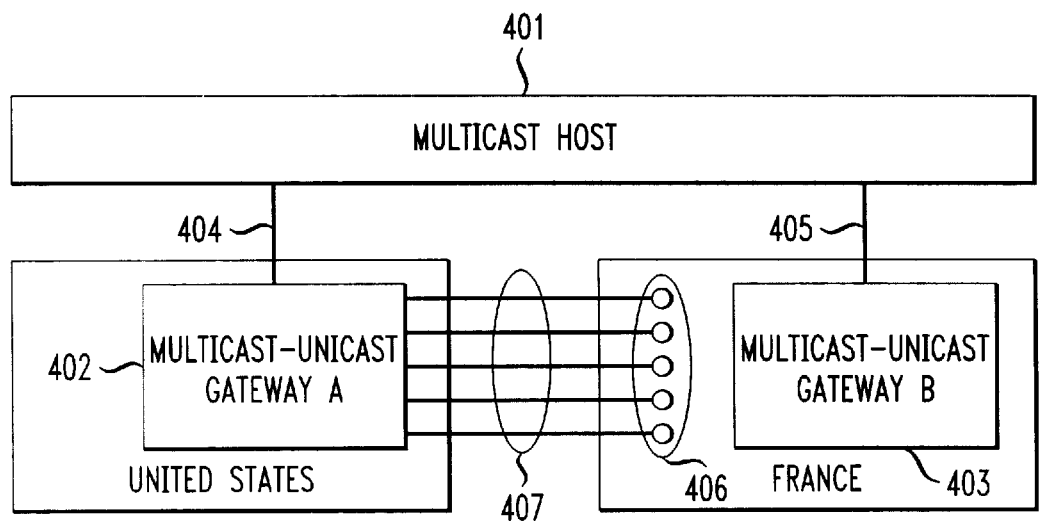
FIG. 1 shows a prior art embodiment of a multicast-unicast gateway in the United States serving unicast hosts in France.
Figure 2:
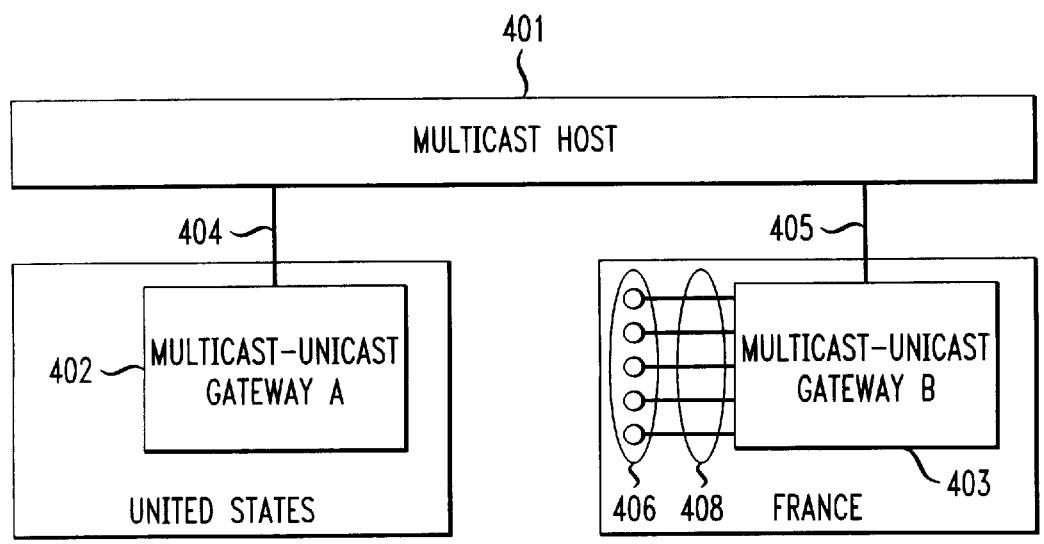
FIG. 2 shows a multicast-unicast gateway in France serving unicast hosts in France in accordance with an embodiment of the present invention.
Figure 3:
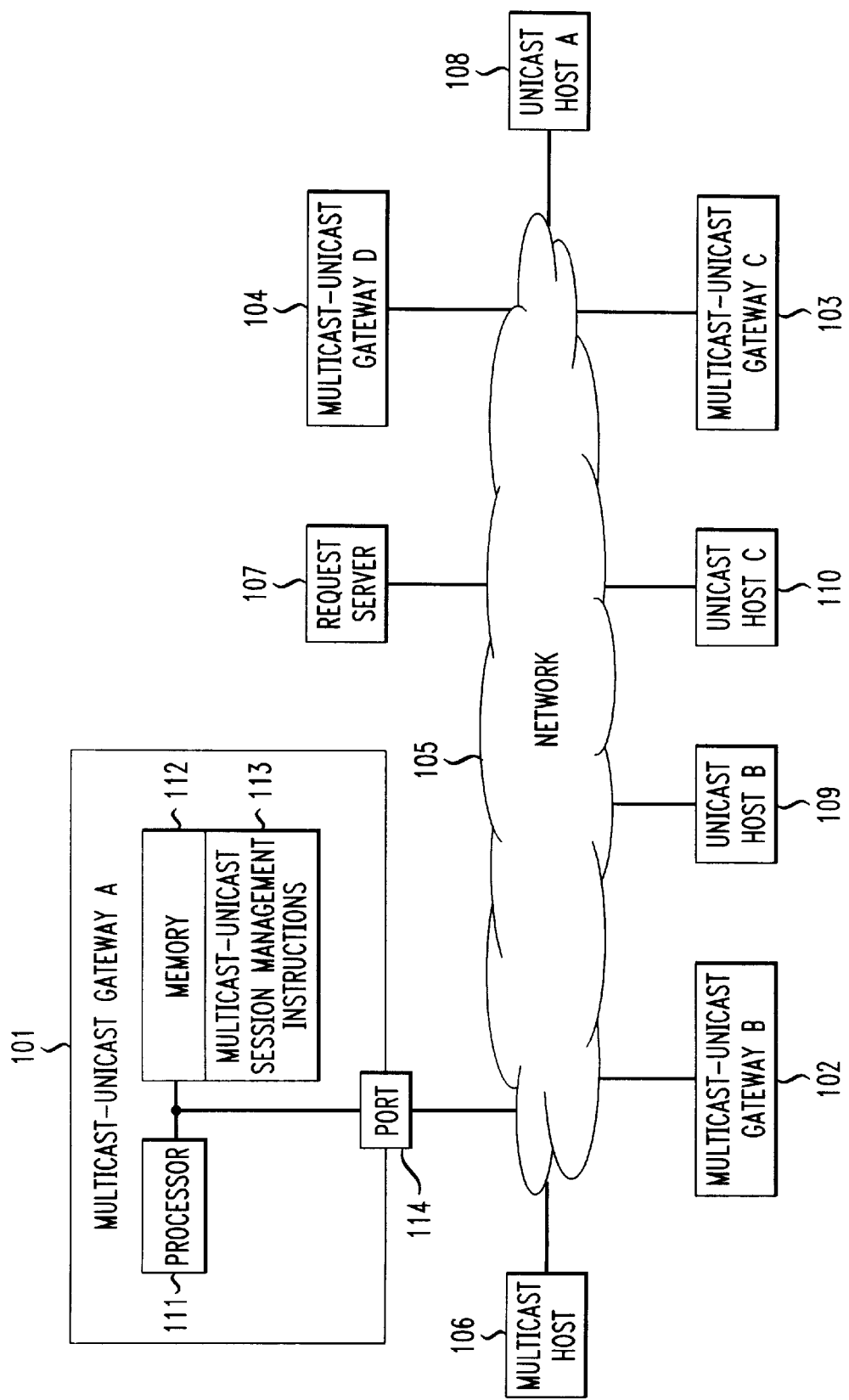
FIG. 3 shows an embodiment of an apparatus in accordance with the present invention.

An embodiment of the apparatus in accordance with the present invention is shown in FIG. 3. MUG (hereinafter, "MUG") A 101, MUG B 102, MUG C 103 and MUG D 104 are coupled to a network 105. Multicast host 106 and request server 107 are also coupled to network 105, as are unicast hosts A 108, B 109 and C 110.

MUG A includes a processor 111, a memory 112 that stores multicast-unicast session management instructions 113 adapted to be executed by processor 111 to perform the steps of the method of the present invention, and a port 114 adapted to be coupled to a network 105. As used herein, the phrase "instructions adapted to be executed" is meant to encompass instructions stored in a compressed and/or encrypted format, as well as instructions that have to be compiled or installed by an installer before being executed by processor 111.

In one embodiment, processor 111 is a general purpose microprocessor, such as the Pentium Pro microprocessor manufactured by the Intel Corporation of Santa Clara, Calif.

In another embodiment, processor 111 is an Application Specific Integrated Circuit (ASIC) that at least partly embodies multicast-unicast session management instructions 113.

Examples of memory 112 include a hard disk, read-only memory (e.g., a compact disk read-only memory), random access memory, flash memory or any combination thereof. Memory 112 is meant to encompass any medium capable of storing digital data.

Figure 4:
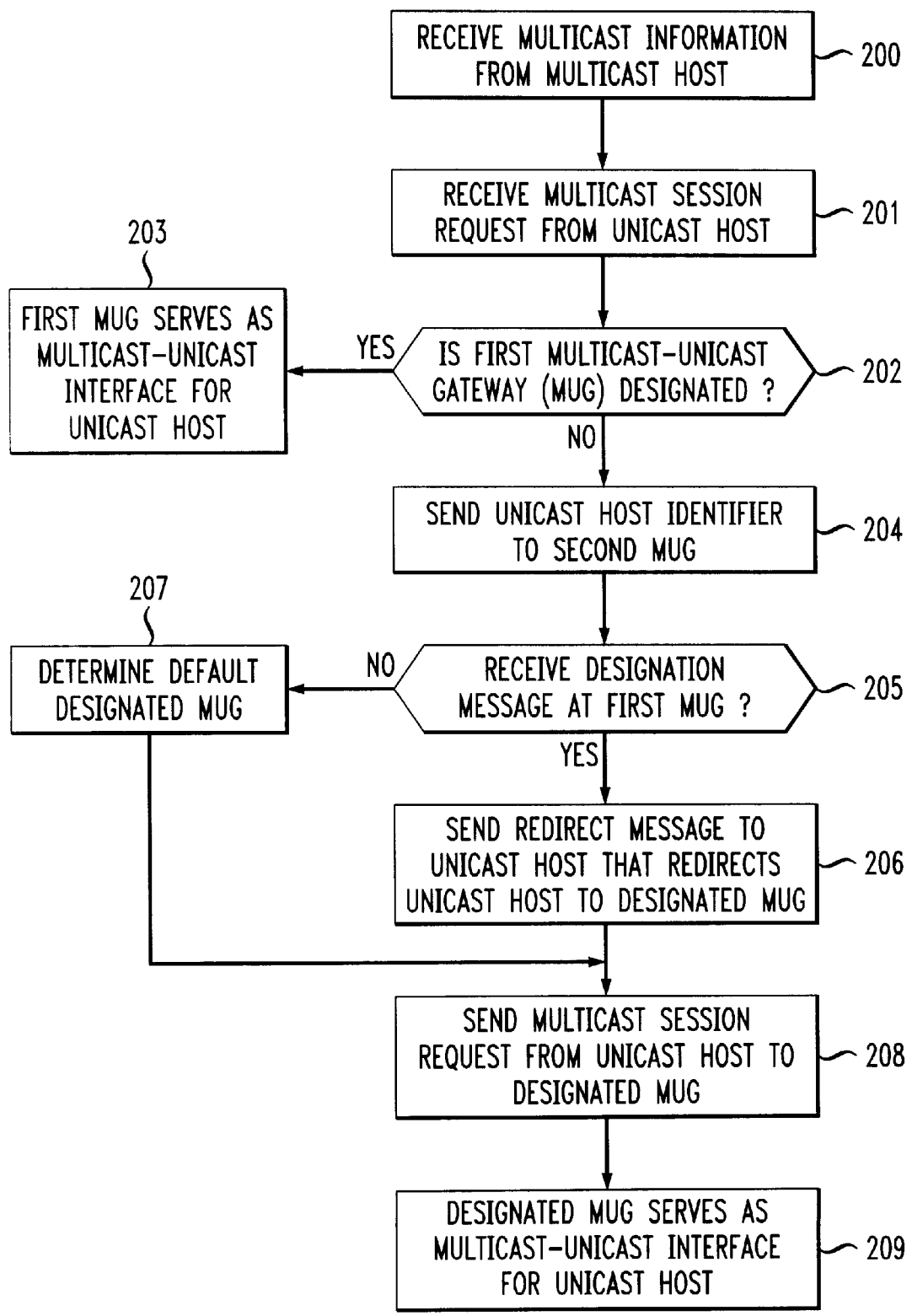
FIG. 4 shows a flow chart illustrating an embodiment of the method in accordance with the present invention.

An embodiment of the method of the present invention is illustrated by the flow chart shown in FIG. 4. Multicast information is received at a first MUG from a multicast host, step 200. A request to join a multicast session is received from a unicast host, step 201. In one embodiment, the multicast session request is initially received by a request server, which is a separate server from the first MUG. In this case, the request server redirects the request to the first MUG. In another embodiment, the request is initially received by the first MUG itself.

It is then determined if the first MUG is designated to serve as the multicast-unicast interface between the unicast host and the multicast host, step 202. In one embodiment, this determination is made by determining if a unicast host identifier received with the request in step 201 is stored in a table at the first MUG. If it is stored in the table, then the first MUG is the designated MUG. If not, then the first MUG is not the designated MUG.

If the first MUG is the designated MUG, then the first MUG serves as the multicast-unicast interface for the unicast host, step 203. If the first MUG is not the designated MUG, then a unicast host identifier is sent to a second MUG, step 204. In one embodiment of the present invention, the unicast host identifier is sent to a plurality of other MUGs. As used herein, this plurality includes the so-called "second MUG." Each MUG that receives the unicast host identifier determines if it is the designated MUG. In one embodiment, each MUG searches a table of unicast host identifiers stored at the MUG for the identifier of the requesting unicast host. If the requesting unicast host identifier is in the table of a MUG, then that MUG is the designated MUG for that unicast host. In another embodiment, the MUG applies a designation algorithm to determine if the MUG is the designated MUG for the requesting unicast host. For example, in one embodiment, the unicast host identifier includes the unicast host's zip code. One MUG is designated for zip codes that fall between 10000 and 14499. Another MUG is designated for zip codes between 14500 and 16000, etc. The MUG determines if the unicast host zip code falls within the range of zip codes for which the MUG is the designated MUG. In another embodiment, the unicast host identifier includes the time zone of the unicast host.

If a designation message is received at the first MUG identifying the MUG determined to be the designated MUG, step 205, then a redirect message is sent from the first MUG to the unicast host that conveys the identity of the unicast host's designated MUG, step 206. If a designation message is not received at the first MUG identifying the MUG determined to be the designated MUG, step 205, then a default MUG is designated, step 207. In one embodiment, the default designated MUG is the first MUG. In another embodiment, the default designated MUG is a predetermined MUG other than the first MUG. In one embodiment, the designation message includes an address for the designated MUG. In one embodiment, the unicast host then sends a multicast session request to the designated MUG, step 208. The designated MUG then serves as the multicast-unicast interface for the unicast host, step 209.

Figure 5:
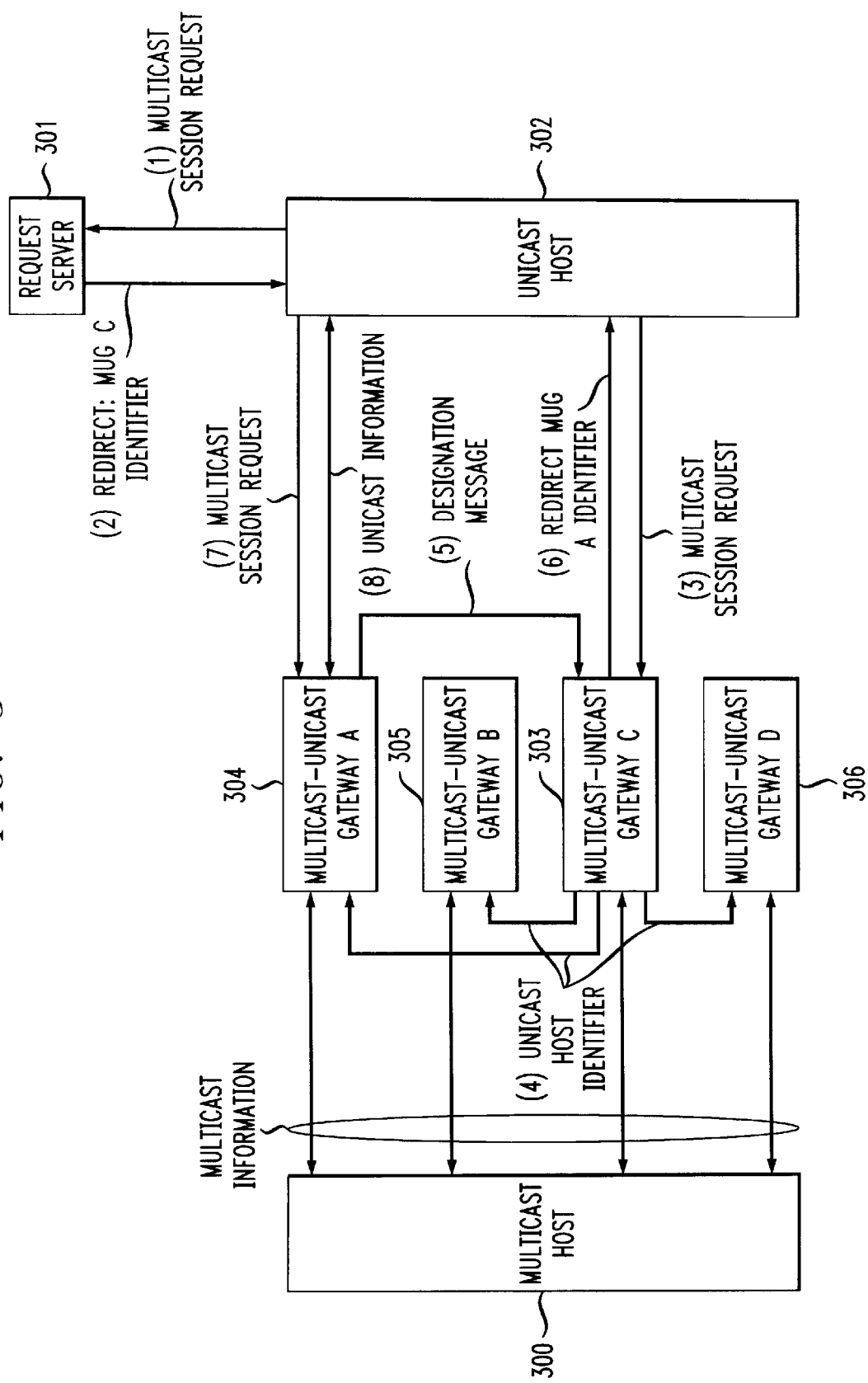
FIG. 5 shows an embodiment of a system in accordance with the present invention.

An embodiment of a system in accordance with the present invention is shown in FIG. 5. The arrows indicate message traffic between the components of the system, which are represented as rectangular boxes. The order in which the messages flow are shown by numbers surrounded by parentheses that occur immediately before each message description. As shown in FIG. 5, a multicast host 300 multicasts information to MUGs A 304, B 305, C 303 and D 306. This information can be sent before, during and/or after the rest of the messages shown in FIG. 5 are sent, because a unicast host can join and drop a multicast session at will. A request server 301 receives a multicast session request (1) from a unicast host 302. The server 301 responds by sending a redirect message (2) to the unicast host 302. The redirect message (2) from the server instructs the unicast host 302 to send multicast session request (3) to MUG C, 303. In this example, MUG C 303 determines that it is not the designated MUG for the unicast host 302, and so sends the unicast host identifier (4) received as part of the redirected multicast session request (3) to the other MUGs to which it is coupled, MUG A 304, MUG B 305 and MUG D 306. In one embodiment, the unicast host identifier is unicast to at least one other MUG. In another embodiment, the unicast host identifier is unicast to a plurality of other MUGs. In another embodiment, the unicast host identifier is broadcast to other MUGs. In yet another embodiment, the unicast host identifier is multicast to other MUGs.

Each MUG to which the unicast host identifier has been forwarded determines if it is the designated MUG for the unicast host 302. In this example, MUG A 304 determines that it is the designated MUG, and sends a designation message (5) to MUG C 303. MUG C 303 then sends a redirect message (6) to the unicast host 302 that identifies MUG A 304 as the designated MUG for the unicast host 302. Unicast host 302 sends a multicast session request (7) to designated MUG A 304, which then serves as an interface between the unicast host 302 and the multicast host 300.

The present invention advantageously ensures that the MUG that sends multicast information to a unicast host is the MUG best disposed to make the most efficient use of network bandwidth in so doing. As a result, the present invention advantageously decreases the cost of sending multicast information to unicast hosts.

What is claimed is:

1. A method for managing the exchange of information between a multicast host and a unicast host, comprising the steps of:
   a. receiving a multicast session request from the unicast host;
   b. determining if a first multicast-unicast gateway is designated to serve as the multicast-unicast interface for the unicast host; and
   c. if the first multicast-unicast gateway is not designated to serve as the multicast-unicast interface for the unicast host, then:
      i. sending a unicast host identifier to a second multicast-unicast gateway;
      ii. if a designation message including an identifier of a multicast-unicast gateway that is designated for the unicast host is received at the first multicast-unicast gateway, then sending a redirect message from the first multicast-unicast gateway to the unicast host that includes an identifier of the designated multicast-unicast gateway; and
      iii. if a designation message is not received at the first multicast-unicast gateway, then determining the identity of a default multicast-unicast gateway that is designated to serve as the multicast-unicast gateway for the unicast host.

2. The method of claim 1, further comprising the steps of:

d. receiving multicast information from the multicast host at the designated multicast-unicast gateway; and e. receiving a multicast session request from the unicast host at the designated multicast-unicast gateway.

3. The method of claim 2, further comprising the steps of:

f. translating multicast information received from the multicast host into unicast information; and g. sending the unicast information to the unicast host.

4. The method of claim 2, further comprising the steps of:

f. receiving unicast information from the unicast host at the designated multicast-unicast gateway; and g. sending the unicast information to the multicast host.

5. The method of claim 1, wherein the unicast host identifier is sent to a plurality of multicast-unicast gateways.

6. The method of claim 1, wherein the unicast host identifier is a network address of the unicast host.

7. The method of claim 1, wherein a multicast-unicast gateway stores a list of unicast host identifiers, and wherein the step of determining if a multicast-unicast gateway is the designated multicast-unicast gateway for a unicast host comprises the step of determining if the unicast host identifier received in the multicast session request is included in the list of unicast host identifiers stored at the multicast-unicast gateway.

8. The method of claim 1, wherein the designation message received at the first multicast-unicast gateway from a second multicast-unicast gateway includes an identifier of the second multicast-unicast gateway.

9. The method of claim 8, wherein the second multicast-unicast gateway identifier is an address of the second multicast-unicast gateway.

10. The method of claim 1, further comprising the steps of:

a. receiving a multicast session request from a unicast host at a request server; and b. sending a redirect message from the request server to the unicast host that includes an identifier of the first multicast-unicast gateway.

11. The method of claim 1, wherein the unicast host identifier includes a geographic indicator.

12. The method of claim 1, wherein the unicast host identifier includes a zip code.

13. The method of claim 1, wherein the unicast host identifier includes a time zone designation.

14. The method of claim 1, wherein the unicast host identifier includes a network address.

15. The method of claim 1, wherein the unicast host identifier includes a priority designation.

16. A multicast-unicast gateway, comprising:

a. a processor;

b. a memory that stores multicast information management instructions adapted to be executed by said processor to receive a multicast session request from a unicast host, determine if said multicast-unicast gateway is designated to serve as the multicast-unicast interface for the unicast host, and if said multicast-unicast gateway is not designated to serve as the multicast-unicast interface for the host, then to send a unicast host identifier to a second multicast-unicast gateway, receive a designation message at the first multicast-unicast gateway that includes an identifier of a multicast-unicast gateway that is designated for the unicast host, and send a redirect message from the first multicast-unicast gateway to the unicast host that includes an identifier of the designated multicast-unicast gateway, said memory coupled to said processor; and c. a port adapted to be coupled to a network, said port coupled to said processor and said memory.

17. The multicast-unicast gateway of claim 16, wherein said multicast information management instructions are further adapted to be executed by said processor to provide a multicast-unicast interface for the unicast host.

18. The multicast-unicast gateway of claim 16, wherein said memory stores a unicast host identifier.

19. A medium that stores instructions adapted to be executed by a processor to perform steps comprising:

a. receiving a multicast session request from a unicast host;

b. determining if a first multicast-unicast gateway is designated to serve as the multicast-unicast interface for the unicast host; and c. if the first multicast-unicast gateway is not designated to serve as the multicast-unicast interface for the unicast host, then:

i. sending a unicast host identifier to a second multicast-unicast gateway;

ii. receiving a designation message at the first multicast-unicast gateway that includes an identifier of a multicast-unicast gateway that is designated for the unicast host; and iii. sending a redirect message from the first multicast-unicast gateway to the unicast host that includes an identifier of the designated multicast-unicast gateway.

20. The medium of claim 19, wherein said medium further stores a unicast host identifier.

21. A system for managing the exchange of information between a multicast host and a unicast host, comprising:

a. means for receiving a multicast session request;

b. means for determining if a first multicast-unicast gateway is designated to serve as a multicast-unicast interface for a unicast host;

c. means for sending a unicast host identifier to a second multicast-unicast gateway;

d. means for receiving a designation message at the first multicast-unicast gateway that includes an identifier of a multicast-unicast gateway that is designated for the unicast host; and e. means for sending a redirect message from the first multicast-unicast gateway to the unicast host.

22. A method for managing the exchange of information between a multicast host and a unicast host, comprising:

a. receiving multicast information from a multicast host;

b. receiving a multicast session request from a unicast host at a first multicast-unicast gateway that belongs to a set of multicast-unicast gateways;

c. identifying the multicast-unicast gateway that is best disposed to serve as a multicast-unicast interface for the unicast host from a set of multicast-unicast gateways; and d. providing a multicast-unicast interface between the multicast host and the unicast host at the best disposed multicast-unicast gateway identified in step c.

23. A multicast-unicast gateway, comprising:
   a. a processor;
   b. a memory that stores multicast information management instructions adapted to be executed by said processor to receive a unicast host identifier, determine if said gateway is a designated gateway, and if said gateway is a designated gateway, to send a designation message, said memory coupled to said processor; and
   c. a port adapted to be coupled to a network, said port coupled to said processor and said memory.

24. The multicast-unicast gateway of claim 23, wherein said multicast information management instructions are further adapted to be executed by said processor to provide a multicast-unicast interface for a unicast host.

25. The multicast-unicast gateway of claim 23, wherein said memory stores a unicast host identifier.

26. A method for managing the exchange of information between a multicast host and a unicast host, comprising the steps of:
   a. receiving a unicast host identifier from a first multicast-unicast gateway at a second multicast-unicast gateway;
   b. determining if the second multicast-unicast gateway is a designated gateway based upon the unicast host identifier;
   c. if the second multicast-unicast gateway is the designated gateway, then sending a designation message from the second multicast-unicast gateway to the first multicast-unicast gateway.

27. The method of claim 26, further comprising the steps of:
   e. receiving multicast information from a multicast host at the second multicast-unicast gateway; and
   f. receiving a multicast session request from a unicast host at the second multicast-unicast gateway.

28. The method of claim 27, further comprising the steps of:
   g. translating multicast information received from the multicast host into unicast information; and
   h. sending the unicast information to the unicast host.

29. The method of claim 27, further comprising the steps of:
   g. receiving unicast information from the unicast host at the second multicast-unicast gateway; and
   h. sending the unicast information to the multicast host.

* * * * *